United States Patent
Tu et al.

(10) Patent No.: US 9,374,657 B2
(45) Date of Patent: Jun. 21, 2016

(54) BLUETOOTH TRANSCEIVER, WIRED HEADPHONE MODULE, AND MOBILE DEVICE MODULE

(71) Applicants: LITE-ON ELECTRONICS (GUANGZHOU) LIMITED, Guangzhou (CN); LITE-ON TECHNOLOGY CORPORATION, Taipei (TW)

(72) Inventors: Chih-Wen Tu, New Taipei (TW); Meng-Yuan Liu, New Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 7 days.

(21) Appl. No.: 14/245,827

(22) Filed: Apr. 4, 2014

(65) Prior Publication Data

US 2015/0208193 A1 Jul. 23, 2015

(30) Foreign Application Priority Data

Jan. 22, 2014 (CN) .......................... 2014 1 0030013

(51) Int. Cl.
*H04W 4/00* (2009.01)
*H04M 1/60* (2006.01)
*H04M 1/02* (2006.01)

(52) U.S. Cl.
CPC ............ *H04W 4/008* (2013.01); *H04M 1/6058* (2013.01); *H04M 1/0258* (2013.01); *H04M 1/6066* (2013.01)

(58) Field of Classification Search
CPC .......................... H04M 1/6058; H04M 1/6066
See application file for complete search history.

(56) References Cited

U.S. PATENT DOCUMENTS

| | | | |
|---|---|---|---|
| 8,213,625 B2 * | 7/2012 | Yamkovoy et al. | 381/58 |
| 9,037,277 B1 * | 5/2015 | Sperring | H04M 1/6058 700/94 |
| 2002/0002413 A1 * | 1/2002 | Tokue | 700/94 |
| 2003/0148788 A1 * | 8/2003 | Kwak | 455/557 |
| 2004/0185915 A1 * | 9/2004 | Ihara et al. | 455/569.1 |
| 2004/0198436 A1 * | 10/2004 | Alden | 455/556.1 |
| 2004/0233073 A1 * | 11/2004 | Sim | 341/22 |
| 2006/0222185 A1 * | 10/2006 | Dyer | H04R 29/008 381/74 |
| 2006/0223594 A1 * | 10/2006 | Chen et al. | 455/575.2 |

(Continued)

*Primary Examiner* — Bobbak Safaipour
*Assistant Examiner* — Devan Sandiford
(74) *Attorney, Agent, or Firm* — Li & Cai Intellectual Property (USA) Office

(57) ABSTRACT

A Bluetooth transceiver is compatible for usage with a wired headphone, in which the wired headphone has a signal transmission line, at least one speaker, a plug and a control interface for generating a trigger signal to control the operation of a mobile device having Bluetooth wireless communication capabilities. The Bluetooth transceiver includes a headphone jack, a processing unit and a Bluetooth module. The headphone jack is accommodates the plug so that the Bluetooth transceiver is electrically connected to the wired headphone. The processing unit receives and decodes the trigger signal to generate a control code. The processing unit selects a control command according to the control code from a lookup table. The Bluetooth module is electrically connected to the processing unit. The Bluetooth module receives the control command and transmits the control command to the mobile device. The mobile device executes the corresponding functions according to the received control command.

24 Claims, 6 Drawing Sheets

(56) References Cited

U.S. PATENT DOCUMENTS

| | | | | |
|---|---|---|---|---|
| 2007/0243909 A1* | 10/2007 | Huang | ............... | H04B 1/385 455/569.1 |
| 2008/0167092 A1* | 7/2008 | Ueda et al. | ............... | 455/575.2 |
| 2010/0069114 A1* | 3/2010 | Lee | ............... | H04M 1/585 455/556.1 |
| 2010/0093275 A1* | 4/2010 | Yoshino et al. | ............... | 455/14 |
| 2012/0009906 A1* | 1/2012 | Patterson | ............... | H04M 1/72519 455/414.1 |
| 2012/0096111 A1* | 4/2012 | Jellinek | ............... | H04M 1/72525 709/217 |
| 2014/0273966 A1* | 9/2014 | Hansen | ............... | H04W 12/06 455/411 |

* cited by examiner

BLUETOOTH TRANSCEIVER, WIRED HEADPHONE MODULE, AND MOBILE DEVICE MODULE

BACKGROUND OF THE INVENTION

1. Field of the Invention

The instant disclosure relates to a bluetooth transceiver; in particular, to a bluetooth transceiver for wirelessly transmitting trigger signals generated from a wired headphone and operationally controlling a mobile device.

2. Description of Related Art

In recent years, with the Internet and rapid development of wireless communication technology, wireless communication plays an increasingly important role in people's lives, particularly in Bluetooth wireless technology which has been widely used in mobile devices such as smart phones, tablet PCs and notebook computers.

Bluetooth wireless technology is a low-power and short-range wireless transmission technology which does not required any wired transmission line (such as a wire or cable) and connects a variety of digital devices, as well as resolves the inconvenience of wired connection between mobile phones and the surrounding electronic devices. More commonly, the Bluetooth wireless communication technology is applicable for wireless headset (i.e., Bluetooth headset for the ears) as the wireless transmission media between wireless headphones and mobile devices, thus users are not limited by the inconvenience of lengthy headphone cables.

However, the typical Bluetooth headset is only available for one ear which provides poor music playback quality. As a result, Bluetooth media receivers emerge from the market where a wired headset having both the left and right channels can be plugged therein. By pressing a button on the Bluetooth media receiver, user can wirelessly control a remote mobile device such as volume adjustment, phone calls answering and receiving, as well as music playback. However, when a wired headset is plugged into Bluetooth media receiver, the mobile devices can only be controlled by pressing the buttons on the Bluetooth media receiver, but not use the buttons on the headphone wire to control mobile devices. Although the Bluetooth media receiver removes the inconvenience of cable and provide good music playback quality for users, users are still required to relearn operations of the Bluetooth media receiver as well as discard the usual wired headphone having control buttons.

To address the above issues, the inventor strives via associated experience and research to present the instant disclosure, which can effectively improve the limitation described above.

SUMMARY OF THE INVENTION

The object of the instant disclosure is to provide a bluetooth transceiver compatible with a wired headphone. The wired headphone includes a signal transmission line, at least one speaker, a plug, and a control interface electrically connected to the speaker and the plug through the signal transmission line. The control interface generates a trigger signal to operatively control a mobile device having bluetooth wireless communication capabilities. The bluetooth transceiver includes a headphone jack, a processing unit and a bluetooth module. The plug can be inserted into the headphone jack, such that the bluetooth transceiver and the wired headphone are electrically connected. The processing unit receives and decodes the trigger signal to generate a control code. The processing unit selects a corresponding control command with respect to the control code from a lookup table. The bluetooth module is electrically connected to the processing unit. The bluetooth receives the control command and wirelessly transmits the control command to the mobile device, such that the mobile device executes the corresponding command.

In an embodiment of the instant disclosure, the bluetooth transceiver further includes the receiver portion electrically connected to the speaker and the plug through the signal transmission line, and the receiver portion receives an external voice signal.

In an embodiment of the instant disclosure, the bluetooth module further includes a codec unit receiving the external voice signal, encoding the external voice signal, and outputting a digital voice signal to the bluetooth module. The bluetooth module wirelessly transmits the digital voice signal to the mobile device.

In an embodiment of the instant disclosure, the bluetooth module further receives an audio signal wirelessly transmitted from the mobile device, and when the bluetooth module receives the audio signal, the bluetooth module transmits the audio signal to the codec unit.

In an embodiment of the instant disclosure, the codec unit decodes the audio signal after reception thereof, and outputs a corresponding stereo audio signal to the speaker of the wired headphone for audio playback.

In an embodiment of the instant disclosure, the bluetooth transceiver further includes a power switch for operatively control activation and deactivation of the bluetooth transceiver.

In an embodiment of the instant disclosure, the bluetooth transceiver further includes a cable winder arranged on the bluetooth transceiver so as to accommodate the signal transmission line of the wired headphone.

In an embodiment of the instant disclosure, the lookup table further includes a plurality of determined identification codes, in which the processing unit compares the identification code of the trigger signal to each of the determined identification codes after reception of the trigger signal and outputs the corresponding control command.

The embodiment further provides a wired headphone module which includes a wired headphone and a bluetooth module. The wired headphone includes a signal transmission line, at least one speaker, a plug, and a control interface. The control interface is electrically connected to the speaker and the plug through the signal transmission line, the control interface generates a trigger signal to operatively control a mobile device having bluetooth wireless communication capabilities. The bluetooth transceiver includes a headphone jack, a processing unit and a bluetooth module. The plug is coupled to the headphone jack such that the bluetooth transceiver and the wired headphone are electrically connected. The processing unit receives the trigger signal and decodes the trigger signal so as to generate a control code. The processing unit determines a control command corresponding to the control code from a lookup table. The bluetooth module is electrically connected to the processing unit, receives and wirelessly transmits the control command to the mobile device, such that the mobile device executes corresponding commands.

Another embodiment of the instant disclosure provides a mobile device module which includes a mobile device, a wired headphone, and a bluetooth transceiver. The mobile device has bluetooth wireless communication functionalities. The wired headphone includes a signal transmission line, at least one speaker, a plug, and a control interface. The control interface is electrically connected to the speaker and the plug through the signal transmission line. The control interface generates a trigger signal to operatively control a mobile device having bluetooth wireless communication capabilities. The bluetooth transceiver includes a headphone jack, a processing unit, and a bluetooth module. The plug is coupled to the headphone jack such that the bluetooth transceiver and the wired headphone are electrically connected. The processing unit receives the trigger signal and decodes the trigger signal so as to generate a control code. The processing unit determines a control command corresponding to the control code from a lookup table. The bluetooth module is electrically connected to the processing unit, receives and wirelessly transmits the control command to the mobile device, such that the mobile device executes corresponding commands.

In summary, the bluetooth transceiver, wired headphone module, and the mobile device module of the embodiments in accordance with the instant disclosure output and wirelessly transmit control commands according to the respective trigger signals to the mobile device in order to execute the corresponding functions on the mobile device by having the processing unit of the bluetooth transceiver compare lookup tables and then having the bluetooth module of the bluetooth transceiver wirelessly transmit control commands. As a result, the bluetooth transceiver, wired headphone module, and the mobile device module of the embodiments in accordance with the instant disclosure provide convenience to user by removing the inconvenience of wires, such that user can continue to use the control buttons on the conventional wired headphones without having to relearn how to use the bluetooth transceiver of the instant disclosure. Since the bluetooth transceiver of the instant disclosure do not require control buttons, the manufacturing cost compared to the conventional bluetooth media transceivers are relatively lower.

In order to further understand the instant disclosure, the following embodiments and illustrations are provided. However, the detailed description and drawings are merely illustrative of the disclosure, rather than limiting the scope being defined by the appended claims and equivalents thereof.

DETAILED DESCRIPTION OF THE PREFERRED EMBODIMENTS

The aforementioned illustrations and detailed descriptions are exemplarities for the purpose of further explaining the scope of a bluetooth transceiver and the operations thereof in accordance with the instant disclosure.

[An Embodiment of the Bluetooth Transceiver]

Figure 1:
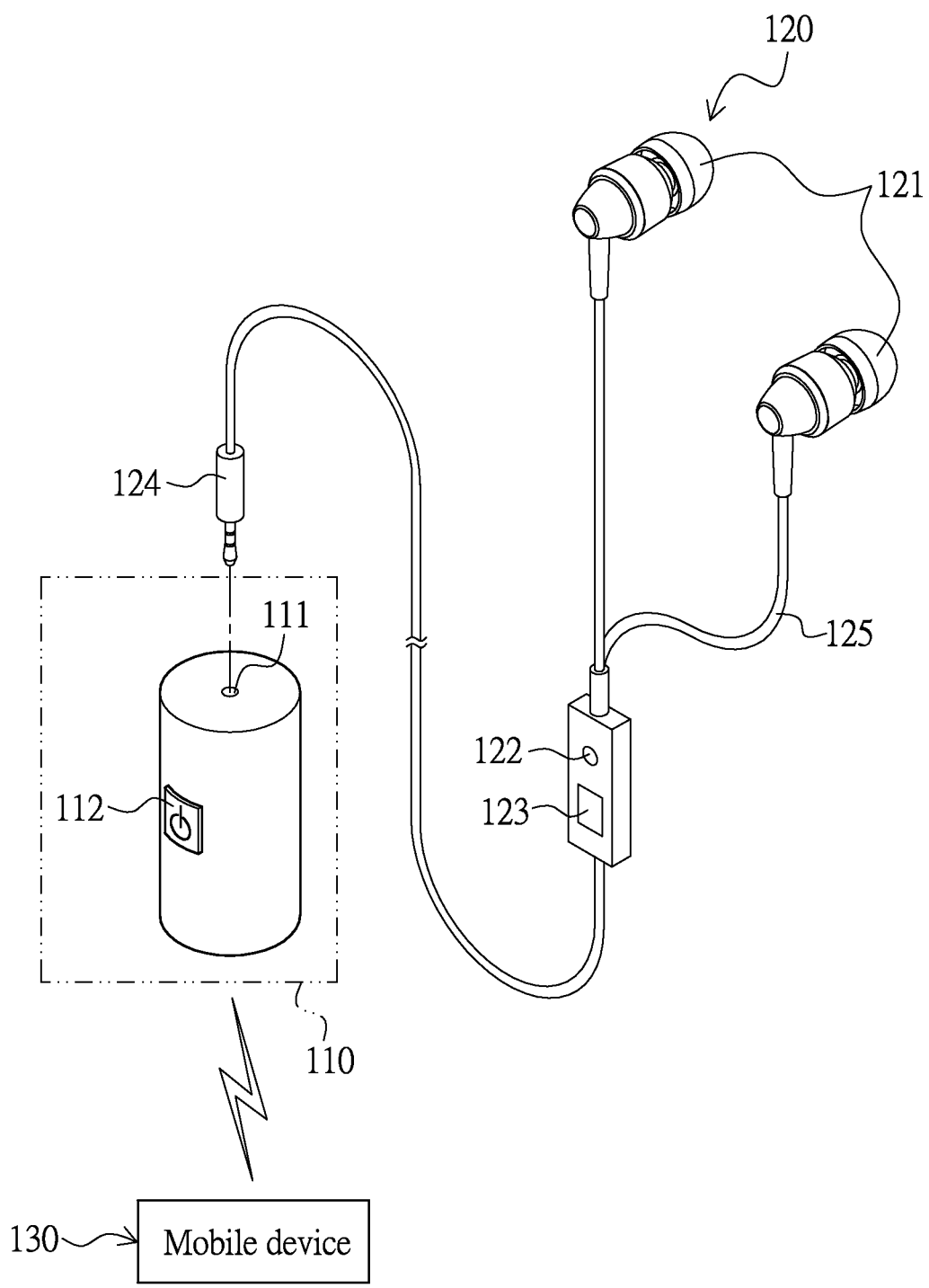
FIG. 1 is a schematic diagram illustrating the application of a bluetooth transceiver in accordance with an embodiment of the instant disclosure.

Please refer to FIG. 1 as a schematic diagram illustrating the application of a bluetooth transceiver in accordance with an embodiment of the instant disclosure. The bluetooth transceiver 110 has a headphone jack 111 for insertion coupling to a wired headphone 120, a power switch 112 and a USB rechargeable jack (not illustrated). The power switch 112 provides users the means for pressingly activate or turning on and off the bluetooth transceiver 110. The USB jack provides an AC-powered connected supply to recharge the bluetooth transceiver 110. The wired headphone 120 includes at least one speaker 121, a receiver portion 122, a control interface 123, a plug 124, and a signal transmission line 125. Specifically, the receiver portion 122 is electrically connected to the speaker 121 and the plug 124 through the signal transmission line 125. The receiver portion 122 can be a microphone for reception of user's voice. The control interface 123 is electrically connected to the speaker 121 and the plug 124 through the signal transmission line 125. The control interface 123 can be a plurality of buttons or knobs for controlling a mobile device 130, such as receiving and ending phone calls, music playback or pause, as well as volume control functions, etc. The plug 124 is inserted to the headphone jack 111 such that the bluetooth transceiver and the wired headphone are electrically connected. Moreover, the mobile device 130 can be a smart phone, a tablet or a laptop.

In the instant embodiment, when the plug 124 is inserted into the headphone jack 111 (assuming the bluetooth transceiver 110 has already been synced with the mobile device 130), user can press the control interface 123 of the wired headphone 120 in order to wireless control the mobile device 130 execute corresponding functions, such as receiving and ending phone calls, music playback or pause, as well as volume control functions and the like, on the mobile device 130. Moreover, user can pick up an incoming call via the receiver portion 122 when the user picks up the incoming phone call on the mobile device 130 via the control interface 123.

Figure 2:
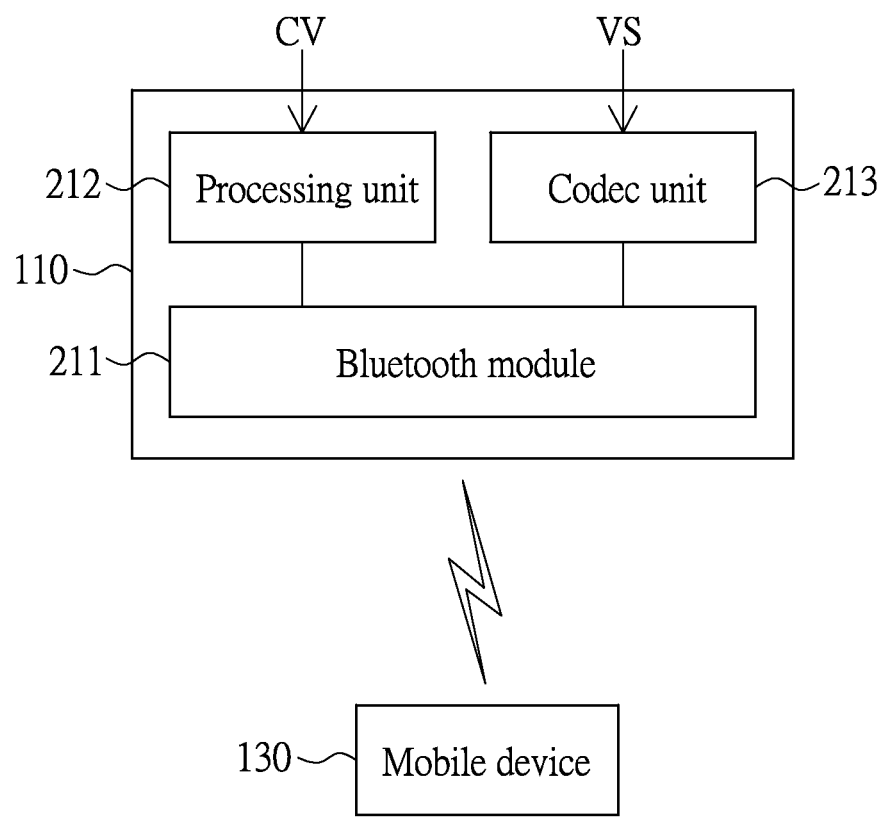
FIG. 2 is a block diagram of the bluetooth transceiver in accordance with the embodiment of the instant disclosure.

Please refer to FIGS. 1 and 2 for further clarifications on the operations of the bluetooth transceiver 110. FIG. 2 is a block diagram of the bluetooth transceiver in accordance with the embodiment of the instant disclosure. As shown in FIG. 2, the bluetooth transceiver 110 includes a bluetooth module 211, a processing unit 212, and a codec unit 213 for encoding and decoding. The bluetooth module 211 is electrically connected to the processing unit 212 and the codec unit 213 in order to receive an audio signal wirelessly transmitted from the mobile device 130. The processing unit 212 can receive and decode a trigger signal CV generated by the control interface 123, and correspondingly generate a control code according to the trigger signal CV decoded. A control command that corresponds to the control code is then chosen from a lookup table by the processing unit 212, and the processing unit 212 can wirelessly transmit the control command to the mobile device 130 via the bluetooth module 211. The codec unit 213 is used for receiving and encoding an external voice signal VS transmitted from the receiver portion 122, as well as for receiving and decoding the audio signal transmitted from the bluetooth module 211.

Furthermore, in the instant embodiment, the processing unit 212 is used for receiving the trigger signal CV generated when user interacts with the control interface 123. After the processing unit 212 receives the trigger signal CV, the processing unit 212 decodes the trigger signal CV and generates the corresponding control codes. Notably, in the instant embodiment, the lookup table as aforementioned is built-in to a storage media (not shown in diagrams) of the processing unit 212. The lookup table has a plurality of determined identification codes (for identifying various wired headphones from different manufacturers), and each determined identification code corresponds to a plurality of control commands. Specifically, after the processing unit 212 decodes the trigger signal CV and correspondingly generates the control code, the processing unit 212 selects the corresponding determined identification codes from the lookup table according to the control code generated. Successively, the control command corresponding to the decoded control code is selected according to the determined identification code chosen. The processing unit 212 then transmits the control command to the bluetooth module 211 so that the control command can be wirelessly transmitted to the mobile device 130 via the bluetooth module 211 and the mobile device 130 can execute the corresponding functions (such as receiving and ending phone calls, music playback and pause, as well as volume control, etc).

For example, if the wired headphone 120 is made by manufacturer A, whereas the control interface 123 of the wired headphone 120 is a typical control interface in the market, such as volume "+" (up) button, volume "−" (down) button, and a central command button. When user presses the volume "+" button of the control interface 123, the processing unit 212 receives and decodes the corresponding trigger signal CV to generate the corresponding control code. The processing unit 212 can then select the corresponding determined identification code with respect to the manufacturer A according to the lookup table. With the determined identification code selected, the processing unit 212 then selects a control command that controls the increase in volume from a plurality of control commands with respect to the manufacturer A. Successively, the bluetooth module 211 wirelessly transmits the selected control commands to the mobile device 130, such that the mobile device 130 executes the volume up function, through which user can wirelessly control the mobile device 130, more importantly user can continue to use the control buttons on the conventional wired headphones without having to relearn how to use the bluetooth transceiver 110 of the instant disclosure. By inserting the wired headphone 120 into the bluetooth transceiver 110, intuitive control according to the user's habits can be provided.

Notably, in one embodiment, the bluetooth transceiver 110 further includes a storage unit (not shown in figures). The storage unit is for storing the lookup table. While the above embodiment of the present invention is shown and described, it is envisioned that those skilled in the art may devise various modifications of the present invention without departing form the spirit and scope of the appended claims.

Moreover, in the instant embodiment, the codec unit 213 is for receiving the external voice signal VS transmitted from the receiver portion 122. The external voice signal VS can be user's voice for example. Furthermore, the codec unit 213 can also receive the audio signal (not shown in figures) transmitted from the bluetooth module 211, where the audio signal can be a voice from an incoming call as well as music. Specifically, in the instant embodiment, when the codec unit 213 receives the external voice signal VS (ex. user's speaking voice), the codec unit 213 begins the encoding process on the external voice signal VS and outputs a digital voice signal (not shown in figures) to the bluetooth module 211. The bluetooth module 211 then wirelessly transmits the digital voice signal to the mobile device 130 for internal digital voice treatment, such that an incoming caller can hear the voice of the user. Alternatively, when the codec unit 213 receives the audio signal transmitted from the mobile device 130, the codec unit 213 decodes the audio signal and correspondingly outputs a stereo audio signal to the speaker 121 of the wired headphone 120 for audio playback, such that the user can hear the voice of the incoming caller or music.

[Another Embodiment of the Bluetooth Transceiver]

Figure 3:
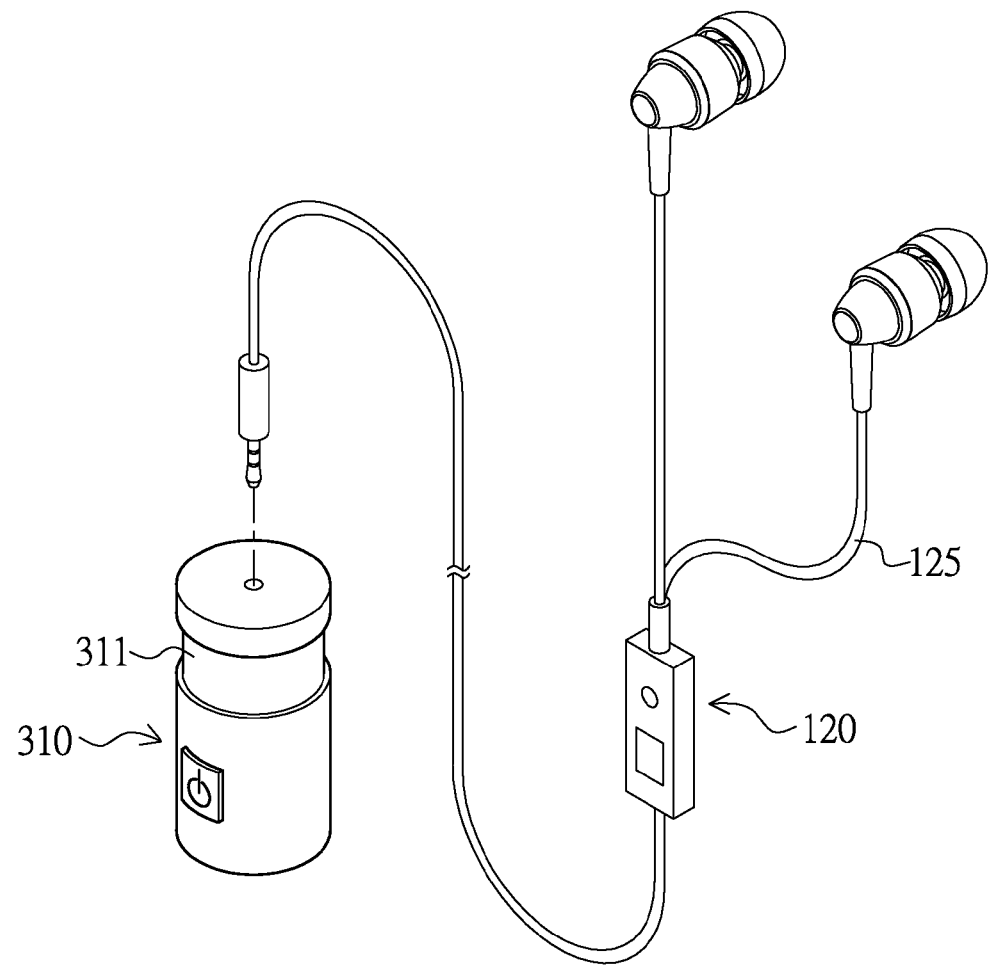
FIG. 3 is a schematic diagram illustrating the application of the bluetooth transceiver in accordance with another embodiment of the instant disclosure.
Figure 4:
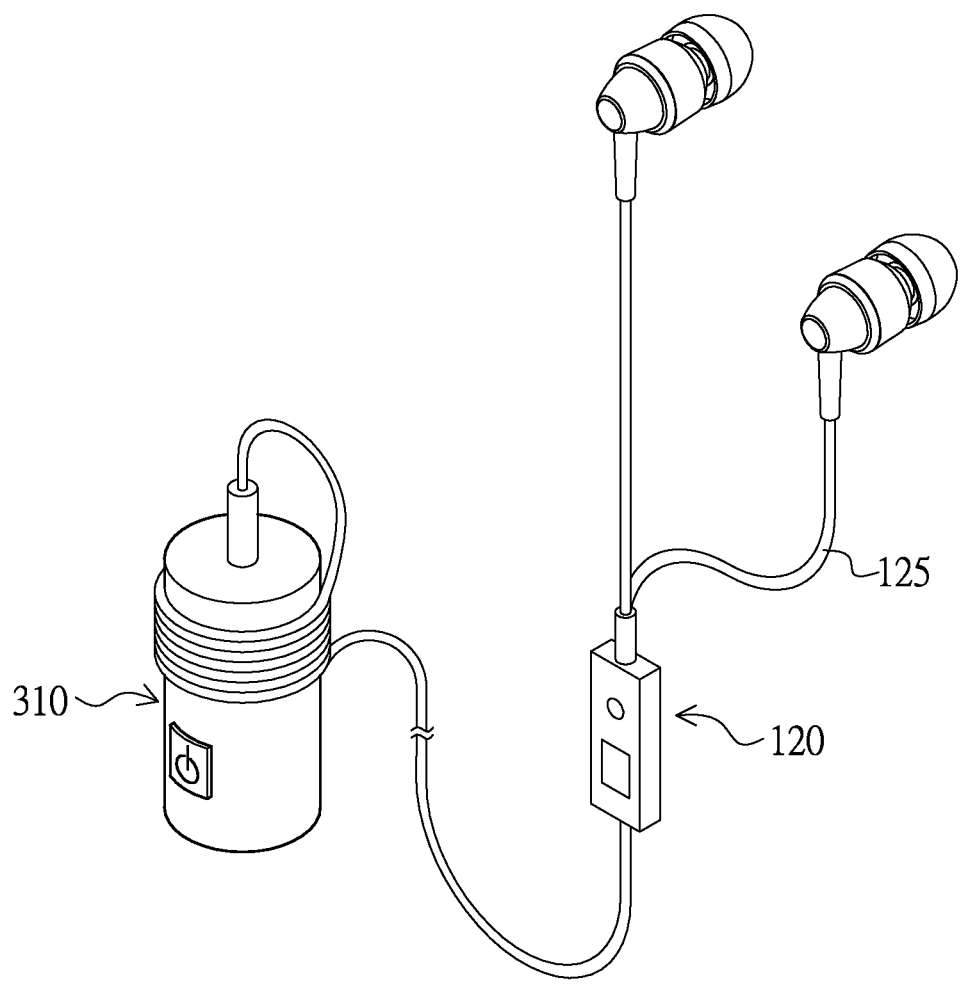
FIG. 4 is a schematic diagram illustrating a signal transmission line of a wired headphone accommodated to a cable winder of the bluetooth transceiver in accordance with the embodiment in FIG. 3 of the instant disclosure.

Please refer to FIGS. 3 and 4. FIG. 3 is a schematic diagram illustrating the application of the bluetooth transceiver in accordance with another embodiment of the instant disclosure, while FIG. 4 is a schematic diagram illustrating the signal transmission line of a wired headphone accommodated to a cable winder of the bluetooth transceiver in accordance with the instant embodiment in FIG. 3 of the instant disclosure. As shown in FIG. 3, the instant embodiment differs from the embodiment in FIG. 1 in that the bluetooth transceiver 310 further includes a cable winder 311 arranged thereon. The cable winder 311 is convenient for storage of the signal transmission line 125 as user can wind excess portions of the signal transmission line 125 about the body of the bluetooth transceiver 310.

Moreover, in the instant embodiment, the bluetooth transceiver 310 can also include a fixture (not shown in figures, for example: a clip) for the convenience of fixing the bluetooth transceiver 310 on user's shirt or backpack.

Notably, similar operations of the bluetooth transceivers for the instant embodiment and the embodiments in FIGS. 1 and 2 are not repeated herein.

[An Embodiment of a Wired Headphone Including the Bluetooth Transceiver]

Figure 5:
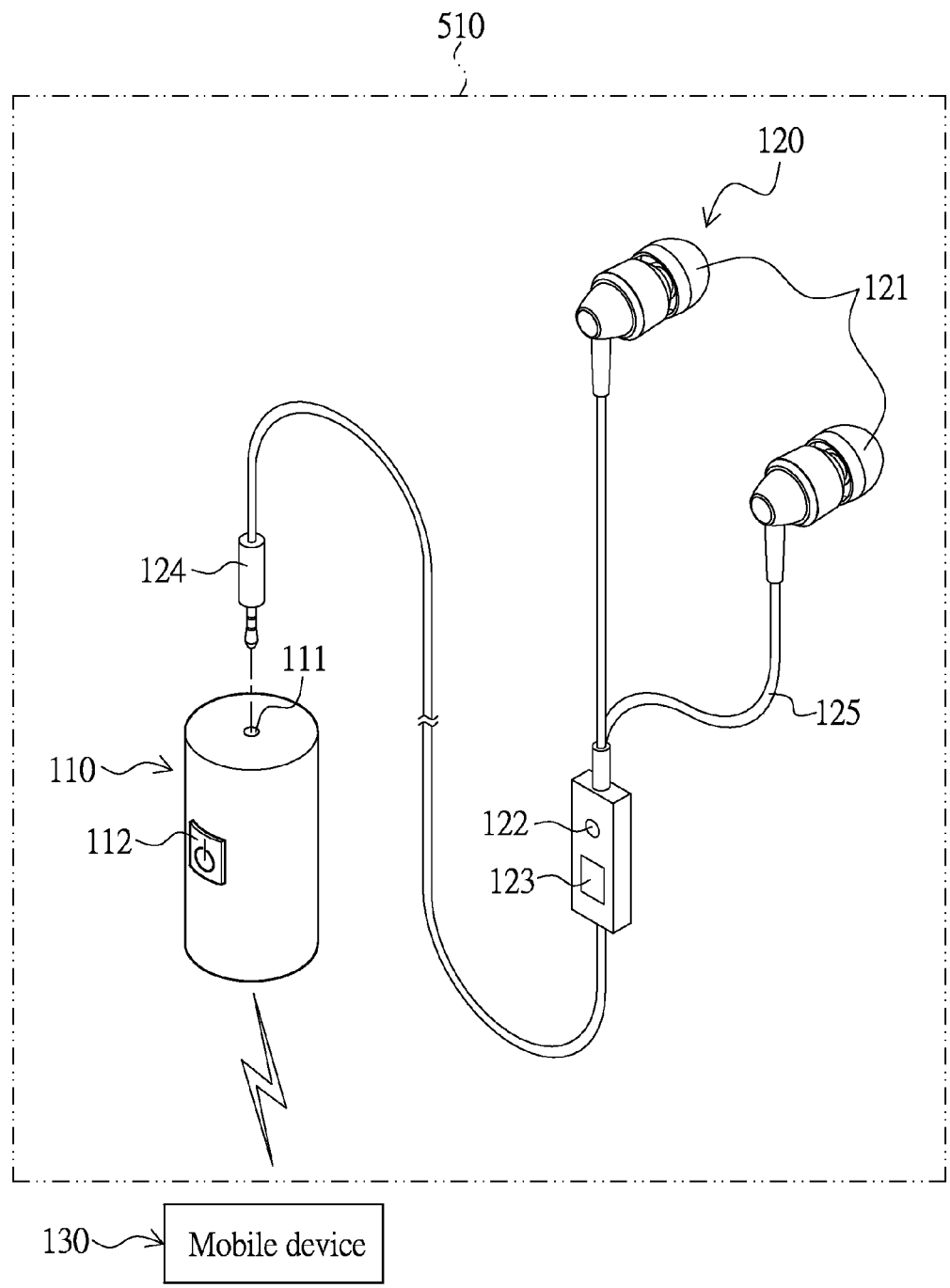
FIG. 5 is a schematic diagram illustrating a wired headphone module of the bluetooth transceiver in accordance with the embodiment of the instant disclosure.

FIG. 5 is a schematic diagram illustrating a wired headphone module of the bluetooth transceiver in accordance with the embodiment of the instant disclosure. The wired headphone module 510 includes the wired headphone 120 and the bluetooth transceiver 110 as aforementioned. The bluetooth transceiver 110 receives the trigger signal CV generated during the operations of the wired headphone 120 controlled by the user. The bluetooth transceiver 110 decodes the trigger signal CV to generate the control code and identifies the control command corresponding to the control code according to the lookup chart. The bluetooth transceiver 110 then wirelessly transmits the control command to the mobile device 130, such that the mobile device 130 executes the corresponding functions. Moreover, the bluetooth transceiver 110 receives the external voice signal VS (such as user's speaking voice) which is transmitted when the user controls the wired headphone 120. In turn, the corresponding digital voice signal VS is generated with respect to the external voice signal VS. Successively, the bluetooth transceiver 110 outputs the digital voice signal to the mobile device 130, so that the mobile device 130 can perform internal digital signal processing and the user can hear the voice of the incoming caller. In addition, the bluetooth transceiver 110 can receive the audio signal (speaking voice of the incoming caller or music playback) wirelessly transmitted from the mobile device 130, decodes the audio signal, and outputs the stereo audio signal to the wired headphone 120 for audio playback. In the instant embodiment, the bluetooth transceiver can be the bluetooth transceiver as shown in FIG. 3, which can also be arranged with the cable winder 311 or the fixture (not shown in FIG. 5).

Notably, similar operations of the bluetooth transceivers, wired headphones and the mobile devices in the instant embodiment and the previous embodiments as shown in FIGS. 1 through 4 are not repeated herein.

[An Embodiment of a Mobile Device Module Including the Bluetooth Transceiver]

Figure 6:
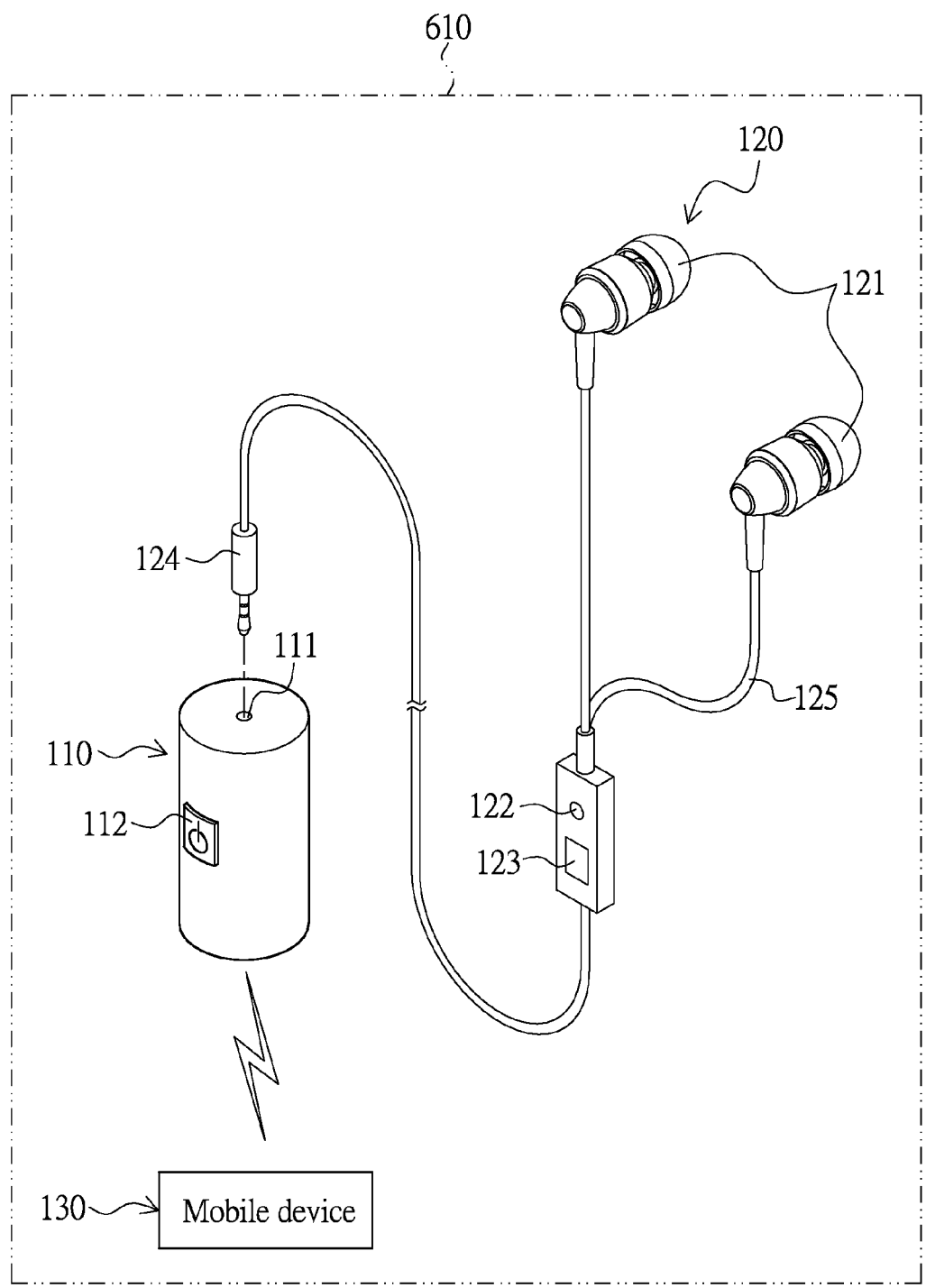
FIG. 6 is a schematic diagram illustrating a mobile device module of the bluetooth transceiver in accordance with the embodiment of the instant disclosure.

Please refer to FIG. 6 as a schematic diagram illustrating a mobile device module of the bluetooth transceiver in accordance with the embodiment of the instant disclosure. The mobile device module 610 includes the aforementioned bluetooth transceiver 110, wired headphone 120 and mobile device 130. The mobile device 130 has wireless bluetooth communication capabilities. When the plug 124 of the wired headphone 120 is inserted into the headphone jack 111 of the bluetooth transceiver 110, such that user can control the control interface 123 of the wired headphone 120 and wireless control the mobile device 130. Moreover, the bluetooth transceiver 110 of the instant embodiment can be the bluetooth transceiver 310 as shown in FIG. 3, which can also be arranged with the cable winder 311 or the fixture (not shown FIG. 6).

Notably, similar operations of the bluetooth transceivers, wired headphones and the mobile devices in the instant embodiment and the previous embodiments as shown in FIGS. 1 through 4 are not repeated herein.

In summary, the bluetooth transceiver, wired headphone module, and the mobile device module of the embodiments in accordance with the instant disclosure output and wirelessly transmit control commands according to the respective trigger signals to the mobile device in order to execute the corresponding functions on the mobile device by having the processing unit of the bluetooth transceiver compare lookup tables and then having the bluetooth module of the bluetooth transceiver wirelessly transmit control commands. As a result, the bluetooth transceiver, wired headphone module, and the mobile device module of the embodiments in accordance with the instant disclosure provide convenience to user by removing the inconvenience of wires, such that user can continue to use the control buttons on the conventional wired headphones without having to relearn how to use the bluetooth transceiver of the instant disclosure. Since the bluetooth transceiver of the instant disclosure do not require control buttons, the manufacturing cost compared to the conventional bluetooth media transceivers are relatively lower.

The figures and descriptions supra set forth illustrated the preferred embodiments of the instant disclosure; however, the characteristics of the instant disclosure are by no means restricted thereto. All changes, alternations, combinations or modifications conveniently considered by those skilled in the art are deemed to be encompassed within the scope of the instant disclosure delineated by the following claims.

What is claimed is:

1. A Bluetooth transceiver compatible for usage with a wired headphone, the wired headphone including a signal transmission line, at least one speaker, a plug, and a control interface, the control interface is electrically connected to the speaker and the plug through the signal transmission line, the control interface generating a trigger signal to control a mobile device having Bluetooth wireless communication capabilities, the Bluetooth transceiver comprising:
a headphone jack accommodating and coupled to the plug such that the Bluetooth transceiver and the wired headphone are electrically connected;
a processing unit receiving the trigger signal and decoding the trigger signal so as to generate an identification code and a control code, in accordance with a lookup table the processing unit determining a control command corresponding to both of the identification code and the control code, wherein various identification codes in the lookup table correspond to different manufacturers of the wired headphone; and
a Bluetooth module electrically connected to the processing unit, receiving and wirelessly transmitting the control command to the mobile device, such that the mobile device executes corresponding commands.

2. The Bluetooth transceiver as recited in claim 1, wherein the wired headphone further comprising:
a receiver portion electrically connected to the speaker and the plug through the signal transmission line, the receiver portion receiving an external voice signal.

3. The Bluetooth transceiver as recited in claim 2, further comprising:
a codec unit receiving the external voice signal, encoding the external voice signal, and outputting a digital voice signal to the Bluetooth module, the Bluetooth module wirelessly transmitting the digital voice signal to the mobile device.

4. The Bluetooth transceiver as recited in claim 1, wherein the Bluetooth module receives an audio signal wirelessly transmitted from the mobile device, and transmits the audio signal to the codec unit.

5. The Bluetooth transceiver as recited in claim 4, wherein the codec unit decodes the audio signal after reception thereof, and outputs a corresponding stereo audio signal to the speaker of the wired headphone for audio playback.

6. The Bluetooth transceiver as recited in claim 1, further comprising:
a power switch operatively controlling activation and deactivation of the Bluetooth transceiver.

7. The Bluetooth transceiver as recited in claim 1, further comprising:
a cable winder arranged on the Bluetooth transceiver so as to accommodate the signal transmission line of the wired headphone.

8. The Bluetooth transceiver as recited in claim 1, wherein the lookup table further comprising:
a plurality of determined identification codes;
wherein the processing unit compares the identification code of the trigger signal to each of the determined identification codes after reception of the trigger signal, and outputs the corresponding control command.

9. A wired headphone module, comprising:
a wired headphone, comprising:
a signal transmission line;
at least one speaker;
a plug; and
a control interface electrically connected to the speaker and the plug through the signal transmission line, the control interface generating a trigger signal to operatively control a mobile device having Bluetooth wireless communication capabilities; and
a Bluetooth transceiver, comprising:
a headphone jack accommodating and coupled to the plug such that the Bluetooth transceiver and the wired headphone are electrically connected;
a processing unit receiving the trigger signal and decoding the trigger signal so as to generate an identification code and a control code, in accordance with a lookup table the processing unit determining a control command corresponding to both of the identification code and the control code, wherein various identification codes in the lookup table correspond to different manufactures of the wired headphone; and
a Bluetooth module electrically connected to the processing unit, receiving and wirelessly transmitting the control command to the mobile device, such that the mobile device executes corresponding commands.

10. The wired headphone module as recited in claim 9, wherein the wired headphone further comprising:
a receiver portion electrically connected to the speaker and the plug through the signal transmission line, the receiver portion receiving an external voice signal.

11. The wired headphone module as recited in claim 10, further comprising:
a codec unit receiving the external voice signal, encoding the external voice signal, and outputting a digital voice signal to the Bluetooth module, the Bluetooth module wirelessly transmitting the digital voice signal to the mobile device.

12. The wired headphone module as recited in claim 9, wherein the Bluetooth module receives an audio signal wirelessly transmitted from the mobile device, and transmits the audio signal to the codec unit.

13. The wired headphone module as recited in claim 12, wherein the codec unit decodes the audio signal after reception thereof, and outputs a corresponding stereo audio signal to the speaker of the wired headphone for audio playback.

14. The wired headphone module as recited in claim 9 further comprising:
a power switch operatively controlling activation and deactivation of the Bluetooth transceiver.

15. The wired headphone module as recited in claim 9 further comprising:
a cable winder arranged on the Bluetooth transceiver so as to accommodate the signal transmission line of the wired headphone.

16. The wired headphone module as recited in claim 9, wherein the lookup table further comprising:
a plurality of determined identification codes;
wherein the processing unit compares the identification code of the trigger signal to each of the determined identification codes after reception of the trigger signal, and outputs the corresponding control command.

17. A mobile device module, comprising:
a wired headphone module having Bluetooth wireless communication capabilities;
a wired headphone, comprising:
a signal transmission line;
at least one speaker;
a plug; and
a control interface electrically connected to the speaker and the plug through the signal transmission line, the control interface generating a trigger signal to operatively control a mobile device having Bluetooth wireless communication capabilities; and
a Bluetooth transceiver, comprising:
a headphone jack accommodating and coupled to the plug such that the Bluetooth transceiver and the wired headphone are electrically connected;
a processing unit receiving the trigger signal and decoding the trigger signal so as to generate an identification code and a control code, in accordance with a lookup table the processing unit determining a control command corresponding to both of the identification code and the control code, wherein various identification codes in the lookup table correspond to different manufacturers of the wired headphone; and
a Bluetooth module electrically connected to the processing unit, receiving and wirelessly transmitting the control command to the mobile device, such that the mobile device executes corresponding commands.

18. The mobile device module as recited in claim 17, wherein the wired headphone further comprising:
a receiver portion electrically connected to the speaker and the plug through the signal transmission line, the receiver portion receiving an external voice signal.

19. The mobile device module as recited in claim 18 further comprising:
a codec unit receiving the external voice signal, encoding the external voice signal, and outputting a digital voice signal to the Bluetooth module, the Bluetooth module wirelessly transmitting the digital voice signal to the mobile device.

20. The mobile device module as recited in claim 17, wherein the Bluetooth module receives an audio signal wirelessly transmitted from the mobile device, and transmits the audio signal to the codec unit.

21. The mobile device module as recited in claim 20, wherein the codec unit decodes the audio signal after reception thereof, and outputs a corresponding stereo audio signal to the speaker of the wired headphone for audio playback.

22. The mobile device module as recited in claim 17 further comprising:
a power switch operatively controlling activation and deactivation of the Bluetooth transceiver.

23. The mobile device module as recited in claim 17 further comprising:
a cable winder arranged on the Bluetooth transceiver so as to accommodate the signal transmission line of the wired headphone.

24. The mobile device module as recited in claim 17, wherein the lookup table further comprising:
a plurality of determined identification codes;
wherein the processing unit compares the identification code of the trigger signal to each of the determined identification codes after reception of the trigger signal, and outputs the corresponding control command.

* * * * *